United States Patent
Jang (10) Patent No.: US 7,719,770 B2
(45) Date of Patent: May 18, 2010

(54) THREE-DIMENSIONAL DISPLAY DEVICE WITH BACKGROUND IMAGE DISPLAY

(75) Inventor: Sun-Joo Jang, Seoul (KR)

(73) Assignee: 3DIS Co., Ltd., Seoul (KR)

( * ) Notice: Subject to any disclaimer, the term of this patent is extended or adjusted under 35 U.S.C. 154(b) by 341 days.

(21) Appl. No.: 11/916,028

(22) PCT Filed: May 30, 2006

(86) PCT No.: PCT/KR2006/002071

§ 371 (c)(1), (2), (4) Date: Nov. 29, 2007

(87) PCT Pub. No.: WO2006/129952

PCT Pub. Date: Dec. 7, 2006

(65) Prior Publication Data

US 2009/0310217 A1   Dec. 17, 2009

(30) Foreign Application Priority Data

May 31, 2005   (KR) .................... 10-2005-0046421

(51) Int. Cl.
G02B 27/14   (2006.01)
G02B 27/10   (2006.01)
(52) U.S. Cl. ...................................... 359/633; 359/618
(58) Field of Classification Search ................. 359/618, 359/629, 633, 636
See application file for complete search history.

(56) References Cited

U.S. PATENT DOCUMENTS

| | | | |
|---|---|---|---|
| 3,537,771 A | 11/1970 | Trufanoff | |
| 4,385,316 A | 5/1983 | Yanagisawa | |
| 5,782,547 A | 7/1998 | Machtig et al. | |
| 5,944,403 A | 8/1999 | Krause | |
| 2009/0219589 A1* | 9/2009 | Ikeda et al. | 359/9 |

FOREIGN PATENT DOCUMENTS

| | | |
|---|---|---|
| JP | 3-253183 | 11/1991 |
| JP | 11-249071 | 9/1999 |
| KR | 2002-0016063 | 3/2002 |
| WO | WO 2006/129952 | 12/2006 |

OTHER PUBLICATIONS

Search Report dated Oct. 19, 2006 for International Patent Application No. PCT/KR2006/002071.

* cited by examiner

*Primary Examiner*—William C Choi
(74) *Attorney, Agent, or Firm*—James P. Muraff; Neal, Gerber & Eisenberg LLP (57) ABSTRACT

The present invention relates to a 3-dimensional video display device using a single image source for background image and object image display, which uses a double Fresnel lens structure, multi-reflector, and half mirror part. In particular, the present invention relates to a 3-dimensional image device with which the problem in prior art of spatial size in obtaining a background image is resolved, and with which a background image of a large display and a 3-dimensional image having an enhanced sense of depth and a large image are displayed simultaneously using only a single image source.

7 Claims, 8 Drawing Sheets

THREE-DIMENSIONAL DISPLAY DEVICE WITH BACKGROUND IMAGE DISPLAY

CROSS REFERENCE TO RELATED APPLICATION

The present Non-Provisional patent application is a national stage continuation application of International Application No. PCT/KR2006/002071, filed on 30 May 2006, which claims priority to Korean Patent Application No. 10-2005-0046421, filed on 31 May 2005, both of which are incorporated herein by reference.

TECHNICAL FIELD

The present invention relates to a display device, particularly to a 3-dimensional video display device with background image display.

BACKGROUND ART

Generally, 3-dimensional display refers to the technology of adding depth information to a 2-dimensional image and using this depth information to allow the viewer to feel a sense of 3-dimensional vividness and reality. Various types have been proposed of typical 3-dimensional display devices in prior art according to such technologies, in a variety of forms and methods. Until now, most of these technologies display 3-dimensional images using the principle of binocular disparity of a human being. As there are slight deviations between images presented to the left eye and to the right eye, perception of the disparity due to the left and right eyes creates a sense of 3-dimensionality, so that a sense of protrusion may be obtained.

A typical form of such technique in prior art is to separate the left and right images, mainly with or without using eyeglasses. Using glasses are the anaglyph type, polarized glasses type, and liquid crystal shutter type, while without glasses are the lenticular sheet type, parallax barrier type, and optical plate type. Among these conventional technologies, the polarized glasses type is the oldest and most stable 3D display type, and is most widely used in 3-dimensional movies and 3-dimensional monitors, etc. The biggest drawback of this method, however, lies in the requirement of using special polarized glasses for 3-dimensional images. The lenticular sheet type and parallax barrier type, among the types not using eyeglasses in prior art, provide low brightness and low resolution images and entail a fixed viewing position for a viewer, to cause headaches or dizziness when viewing for an extended period of time. There are also complete 3-dimensional types, including the holographic and volumetric 3D display types. While these types can produce 3-dimensional images freely in a space, they require expensive laser and precision optical components to display even a still image, and cannot provide real-time 3-dimensional images.

On the other hand, as methods for solving these problems, some non-glasses types have been proposed that utilize reflectors, conventional optical lenses, and concave mirrors, etc., to enable real-time 3-dimensional images at lower costs. However, most of these methods experience distortion of images due to the concave mirrors, etc., and high costs of manufacturing when large devices are used. In particular, when large devices are used in order to obtain a large display, there is a need to form a very large width of space, which is a large obstacle with regard to the utility and applicability of these types.

In addition to these methods using concave mirrors and reflectors, methods using Fresnel lenses, such as in the present invention, have been proposed in various types for a long time. As in U.S. Pat. No. 3,537,771 (granted Nov. 3, 1970), it has been disclosed that two Fresnel lenses can be used to result in a 3-dimensional image effect. In particular, as in U.S. Pat. No. 5,782,547 (granted Jul. 21, 1998), it has been disclosed that one or two or more Fresnel lenses and reflectors, etc., can be used to create 3-dimensional images in a form having background images. These technologies have the drawbacks of increased manufacturing costs due to the use of several independent image sources and half mirrors for obtaining several background images, and of the large volume of space required by the overall structure of the device, which are large obstacles to their commercialization.

Figure 1:
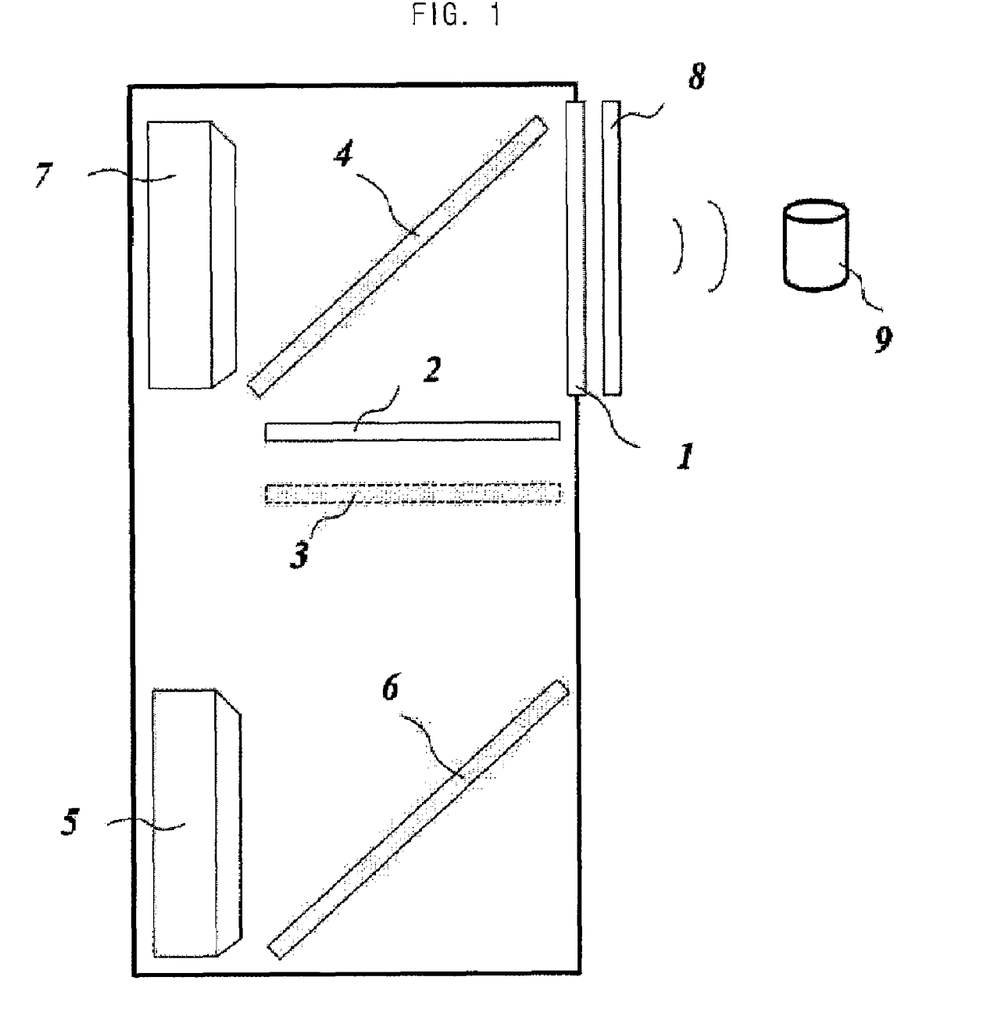
FIG. 1 shows a 3-dimensional video device with background display based on an embodiment of prior art.

Referring to FIG. 1, which illustrates a 3-dimensional display device based on prior art, an image projected from an object image source supply part 5 is reflected by means of a reflector 6, and is reflected again by a half mirror 4 to be projected towards a second Fresnel lens 1. The second Fresnel lens 1 and a first Fresnel lens 2 work in combination like a single lens, so that a 3-dimensional image 9 appears within the focal length region of the double Fresnel lenses (the second Fresnel lens 1 and the first Fresnel lens 2). Also, in order to obtain a background image, an image projected from a background image source supply part 7 is transmitted through the half mirror 4 which removes light from the second Fresnel lens 1 and from the outside, and is transmitted through a dark filter 8 which increases the 3-dimensional image effect, to be positioned behind the 3-dimensional image 9 as a background image to the 3-dimensional image 9. This is to allow the expression of a sense of depth of the background image and the object image by maintaining a particular distance with respect to the focal length of the double Fresnel lens structure. Also, in order to adjust the size of the 3-dimensional image 9 and the sense of depth provided by the filter 8 in FIG. 1, a third Fresnel lens 3 may be used with the object image source supply part 5, between the reflector 6 and the half mirror 4, and its position may be controlled to effect the adjustment.

As described so far, the conventional technologies require two mutually independent image sources when creating a 3-dimensional image having a background display, and a particular distance must be maintained with respect to the object image source supply part 5. There is also a problem that when large devices are used, the distance from the position of the double Fresnel lenses to the object image source supply part 5 forms a very wide projection distance, to increase the overall volume of the device. This is because of an inherent property of Fresnel lenses that the image source supply part must maintain a certain distance with respect to the certain focal length of the double Fresnel lenses.

SUMMARY OF THE INVENTION

The present invention, contrived to overcome the problems and limitations of the conventional methods described above, aims to provide a 3-dimensional image display device, which adjusts the size of the 3-dimensional image by adjusting the distance between the first Fresnel lens and the second Fresnel lens using the double Fresnel lenses, and which enables a large display of background images and object images at a low manufacturing cost using a single image source.

It is another objective of the present invention to provide a 3-dimensional image display device which allows a very narrow width of the projection space to minimize the space for installation of the device, using a multi-reflector and a half mirror.

Yet another objective of the present invention is to provide a 3-dimensional image display device which renders a greater sense of perspective for a large display of an object image having a background image. Other objects of the present invention will become more apparent through preferred embodiments described below.

One aspect of the present invention may provide a 3-dimensional image display device, comprising an image source supply part split into two or more displays supplying different image sources, a first lens part for reflecting and refracting a first image source projected by the image source supply part, a half mirror part for reflecting and refracting the first image source projected from the first lens part and a second image source projected from the image source supply part, and a second lens part for refracting the first image source and the second image source projected by the half mirror part to form a 3-dimensional image.

Here, the first image source may be an object image, the second image source may be a background image, and the 3-dimensional image may be a synthetic image of the object image and the background image.

Also, the first lens part of the 3-dimensional image display device based on the present invention may comprise a first reflector for reflecting the first image source, a first Fresnel lens for refracting the first image source reflected from the first reflector, and a second reflector and a third reflector, joined perpendicularly, for reflecting the first image source refracted from the Fresnel lens towards the half mirror part.

Here, the second lens part may comprise a second Fresnel lens for refracting the first image source and the second image source.

Further, the image source supply part may be split into a matrix form of four or more displays supplying different image sources, each of the split displays supplying an object image or a background image.

Also, the first lens part may be positioned between the second reflector and the third reflector and may further comprise a third Fresnel lens for refracting the first image source.

Here, the second lens part may further comprise a fourth Fresnel lens for refracting the first image source and second image source to adjust the size and position of a 3-dimensional image.

In addition, the distortion of a 3-dimensional image may be reduced in accordance with the distance between the center of each of the two split image sources and the first Fresnel lens and the difference in distance between the boundaries of the image sources and the second Fresnel lens.

DETAILED DESCRIPTION

The 3-dimensional image display device based on preferred embodiments of the present invention will be described below in detail with reference to the accompanying drawings.

The present invention uses one image source, and is composed such that the display image is vertically separated to be displayed on two displays, with the object image transmitted through a half mirror part and a multi-reflector including a first Fresnel lens, and with the background image reflected by the half mirror part and transmitted through a second Fresnel lens. By means of this composition, the present invention may maintain a very narrow volume of the overall device, and may provide a highly 3-dimensional effect, as the background image and object image are separated spatially to provide an enhanced sense of depth, while the object image appears to float in the air to be displayed in a 3-dimensional form.

The Fresnel lenses, referred to in embodiments of the present invention, are thin, flat Fresnel lenses, formed by providing a certain pattern of curvature on the surface such that they have identical optical properties with regular convex lenses, and are mainly used in projection televisions and overhead projectors. The Fresnel lenses of such type may be substituted by positive relief Fresnel lenses, and depending on the arrangement with respect to the directions of the grooves of the Fresnel lenses, by negative relief Fresnel lenses. Before describing preferred embodiments of the present invention, the general principles of creating 3-dimensional images using a serial arrangement structure of two Fresnel lenses, will be described below with reference to FIG. 2.

Figure 2:
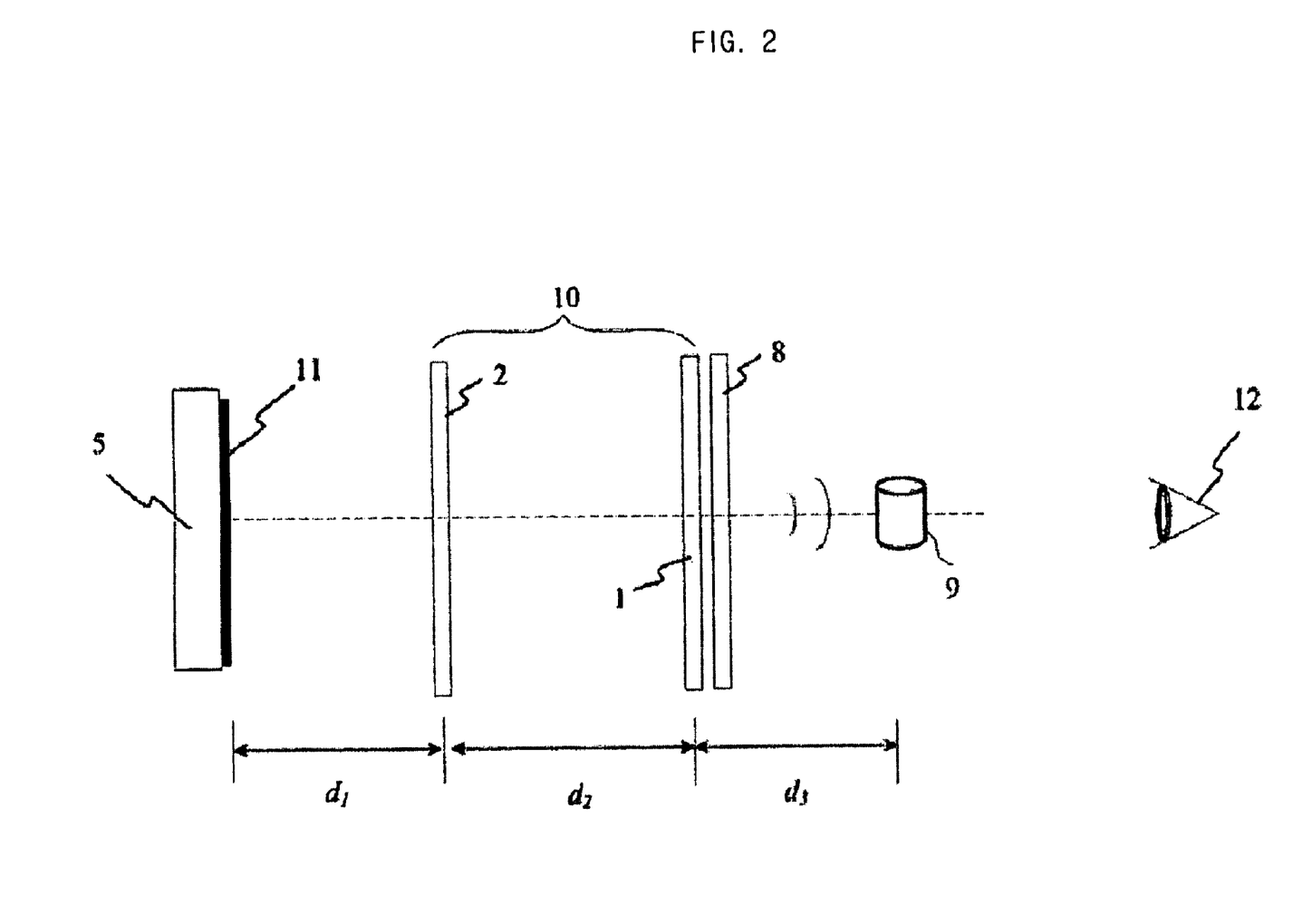
FIG. 2 is a schematic diagram illustrating 3-dimensional video display using a double Fresnel lens structure.

FIG. 2 is a schematic diagram illustrating 3-dimensional video display using a double Fresnel lens structure.

In describing the principle of creating a 3-dimensional image using Fresnel lenses in FIG. 2, two single Fresnel lenses are serially arranged, and then the distance d2 between the two lenses are controlled such that the two Fresnel lenses are positioned in close proximity to have a property similar to that of a single lens, or such that the distance is maintained to be equal to or greater than the focal length of one lens.

As with a regular lens, a Fresnel lens also has an F number. The focal length and F number in accordance with the diameter of a Fresnel lens have the following relation expressed in Eq. 1.

$$F = f/D \tag{1}$$

Here, f is the focal length of the Fresnel lens, D the diameter of the Fresnel lens, and F the F number. A Fresnel lens thus has an F number In general, there are two forms of Fresnel lenses: the positive relief Fresnel lens, functioning as a collector, which refracts parallel incident light to converge to the focal point of the Fresnel lens, or as a collimator, which refracts incident light to the opposite direction to have a parallel path, and the negative relief Fresnel lens, functioning as a diverger, which disperses parallel incident light.

Here, when projecting a 2-dimensional image source using two Fresnel lenses, a virtual image is formed on the focal plane of the projected image source, which is formed in a spherical shape within a certain focal length region, depending on the distance of the double Fresnel lenses 10. When observed from the perspective of a viewer 12, the 3-dimensional image 9 seems as if it is floating in space.

More specifically, with regards the image source 5, the size of the image projected from the focal plane of a 3-dimensional image and the distance d3 can be adjusted by changing the position of d1 for the focal length of the double Fresnel lenses 10, including the second Fresnel lens 1 and the first Fresnel lens 2. Also, the distance d3 to the 3-dimensional image 9 projected from the first Fresnel lens 2 can be adjusted by adjusting the distance d2, which is the distance between the second Fresnel lens 1 and the first Fresnel lens 2. The 2-dimensional image 11 from the image source is thus transmitted through the first Fresnel lens 2, where the image from the image source projected into the first Fresnel lens 2 becomes refracted toward the focal point of the lens.

The image, converged as such, is then transmitted through the second Fresnel lens 1, and is refracted again toward the focal point of the second Fresnel lens 1, at which time the first Fresnel lens 2 and the second Fresnel lens 1 function as a single Fresnel lens having a focal length that is equal to or shorter than the focal length of each Fresnel lens, and a 3-dimensional image 9 is formed at a certain distance d3. In other words, the double-refracted image of the image source is projected to the focal plane of the double Fresnel lenses 10 to form a 2-dimensional image. There can be two shapes of focal plane, depending on the arrangement of the direction of grooves on the Fresnel lenses. If the curved surfaces of the second Fresnel lens 1 and first Fresnel lens 2 are arranged to face each other, a semi-spherical focal plane is formed, while a less curved focal plane is formed if the directions of the grooves are in opposite directions or in the same direction.

In order to obtain a background image and a 3-dimensional image simultaneously as in the present invention, the focal lengths of the second Fresnel lens 1 and first Fresnel lens 2 can be arranged to be identical or different in the double Fresnel lens 10 structure. According to an embodiment of the present invention, the F number of each Fresnel lens is between 0.5 and 1.5. With an F number of 1.5 or higher, a blurry image is created; with an F number of 0.5 or lower, manufacturing becomes difficult, and the actual image is projected, departing from the object of the invention. As such, the double Fresnel lenses also have a single F number, and according to the embodiment, the F number is either identical to or half of the F number of a Fresnel lens of the same focal length. The distance d2 between the second Fresnel lens 1 and first Fresnel lens 2 is either identical to or greater than the focal length of the second Fresnel lens 1, and can be controlled to be as small as possible within a range in which the 3-dimensional image is not distorted. Here, the distance d1 between the first Fresnel lens 2 and the image source 5 is within the focal length of the first Fresnel lens 2, where the first Fresnel lens 2 acts as a magnified form of the image source. The image source, thus having a distance of d1 and magnified after passing through the first Fresnel lens 2, is transmitted through the second Fresnel lens 1 to express a 3-dimensional image and is transmitted through a dark filter, which is for reducing the amount of outside light and enhancing the effect of the 3-dimensional image, to create a 3-dimensional image that appears as if it is floating in air. Here, the first Fresnel lens 2 and the second Fresnel lens 1 may have identical or different focal lengths. Also, in creating a 3-dimensional image as in the present invention, the distance of d1 must be maintained equal to or less than the focal length of the first Fresnel lens 2, and the distance of d2 must be maintained equal to or greater than the focal length of the second Fresnel lens 1, to obtain a desirable 3-dimensional image. The size of the displayed 3-dimensional image and the distance d3 may be controlled by controlling d1 and d2.

A schematic diagram was described above generally illustrating a 3-dimensional video display device having background display, and below a description will be given of a 3-dimensional video display device having background display based on the present invention, with reference to the accompanying drawings and with regards specific embodiments. There are three main embodiments of the present invention, the first for providing the object image and background image separately from the image source supply part, the second for providing the object image and background image separately in a matrix form, and the third for adjusting the size or position of the 3-dimensional image using several Fresnel lenses. The embodiments will be described below in order.

Figure 3:
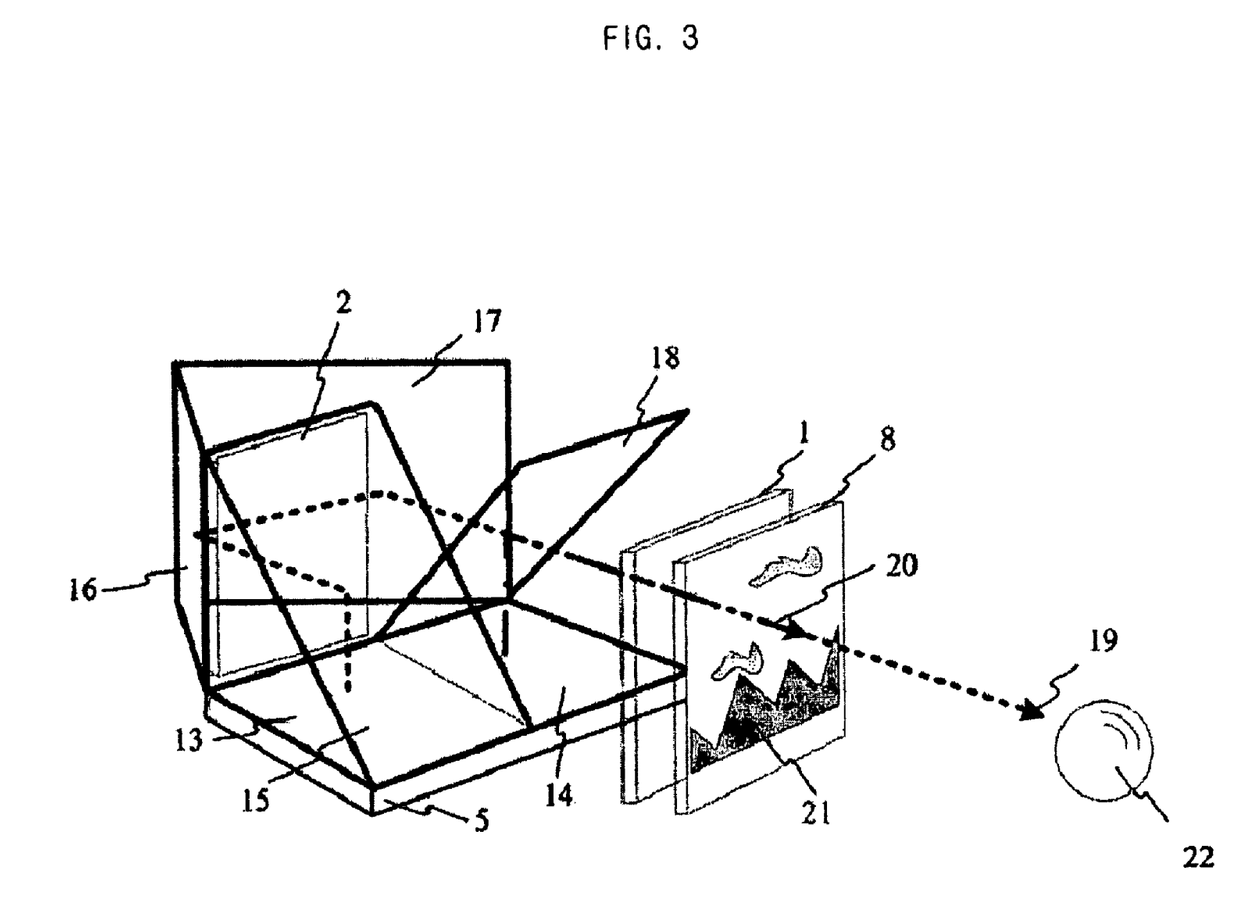
FIG. 3 is a structural diagram of a 3-dimensional video display device based on a first preferred embodiment of the present invention.

FIG. 3 is a structural diagram of a 3-dimensional video display device based on a first preferred embodiment of the present invention.

According to the present invention, a 3-dimensional image display device is provided, in which a single image source is split in two, each used as an object image 13 and a background image 14 transmitted and reflected by a multi-reflector part and a half mirror part 18, and the image sources are transmitted through the first Fresnel lens 2 and second Fresnel lens 1 and a dark filter 8 to be projected simultaneously in a space as a background image 14 and a 3-dimensional image 22. Herein, the portion including the multi-reflector part and the first Fresnel lens 2 is referred to as the first lens part, and the portion including the second Fresnel lens 1 and the filter 8 is referred to as the second lens part.

In the 3-dimensional image display device based on the first preferred embodiment of the present invention, the object image 13 is reflected by the first reflector 15 and refracted and magnified by the first Fresnel lens 2, and then is reflected again by the second reflector 16 and the third reflector 17, and proceeds overall along optical projection path 19 from the object image surface 13 of FIG. 3. Also, by use of the half mirror part 18, the background image 14 directly projected from the image source 5 is reflected to proceed along optical path 20. Thus the object image and background image are transmitted through the second Fresnel lens 1, and a 3-dimensional effect is produced where the background image is displayed as a 2-dimensional background image 21 on the inner and outer surfaces of the dark filter, which acts as a screen for the device. At the same time, the object image having an enhanced sense of depth with respect to the background image 21 appears as if it is floating in air as a 3-dimensional image 22.

With regards the image source 5, according to the present invention, a single image source can be divided in two to obtain two independent images, formed simultaneously with one as the background image 14 and one as the object image 13.

Figure 4:
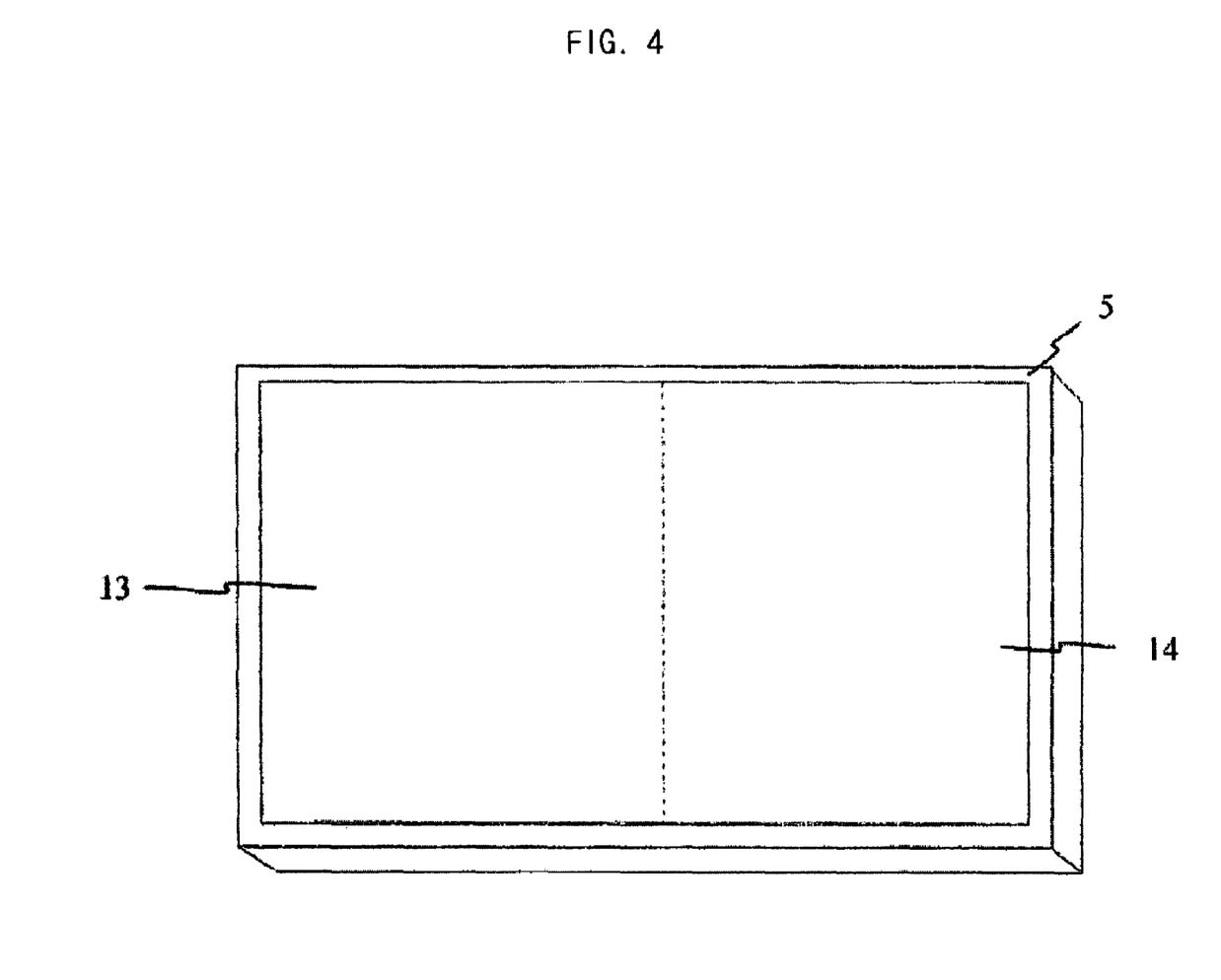
FIG. 4 is a schematic diagram of an image source for a 3-dimensional video display device based on a first preferred embodiment of the present invention.

FIG. 4 is a schematic diagram of an image source for a 3-dimensional video display device based on the first preferred embodiment of the present invention. Changes may be made in the sizes and positions of the background image 14 and object image 13 by controlling the distance d2 between the second Fresnel lens 1 and first Fresnel lens 2, to obtain the desired size of the 3-dimensional image 22. Additional software or supplementary devices may also be used for a display of images split in two from a single image source as in FIG. 4.

In prior art, a very wide space is required to implement the device, since the object image source 5 must be positioned at a certain distance to the second Fresnel lens 1, with the background image source 7 positioned on the back surface. With the present invention, however, to reduce the width of the overall space of the 3-dimensional image display device, the 3-dimensional image display device may be manufactured in a minimized form using a single half mirror part 18 and a multi-reflector part (or first lens part) including a single image source 5 and a first Fresnel lens. That is, by using a reflector part (or first lens part) including a first Fresnel lens, a 3-dimensional image display device may be manufactured that can ensure the certain distance d2 illustrated in FIG. 2, while reducing the overall space.

Figure 5:
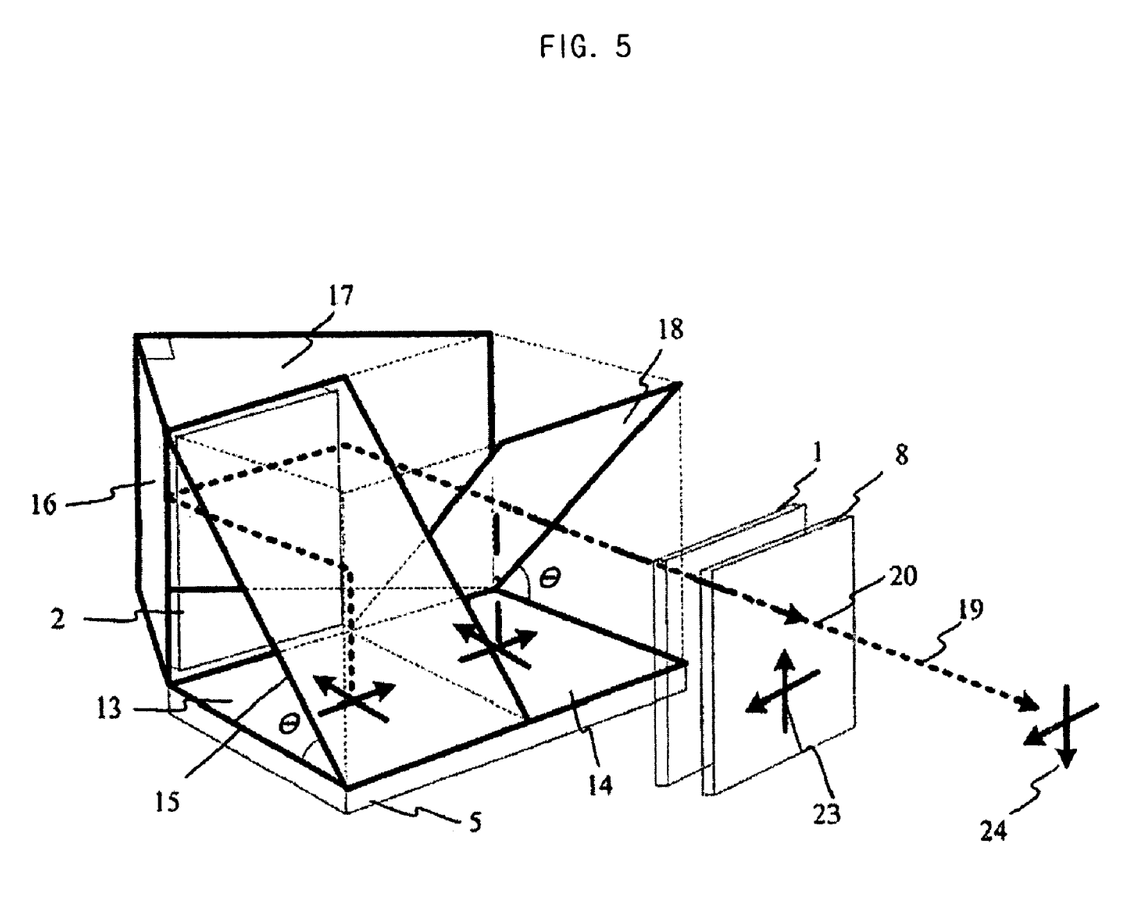
FIG. 5 is a schematic diagram illustrating the production of an image with a 3-dimensional video display device based on a first preferred embodiment of the present invention.

FIG. 5 is a schematic diagram illustrating the production of an image with a 3-dimensional video display device based on the first preferred embodiment of the present invention.

Referring to FIG. 5, the 3-dimensional image display device is composed of the object image surface 13 and the background image surface 14, which are the two displays separated by the image source supply part 5. First, the object image surface 13 is given an angle of 45 degrees to the first reflector 15 and is reflected towards the first Fresnel lens 2, and then the image refracted and magnified by the first Fresnel lens 2 is transmitted through the half mirror part 18 by means of the second reflector 16 and the third reflector 17, formed in a 90 degree angle, to be reflected in the direction of the second Fresnel lens 1 along optical path 19. Here, the background image surface 14 also has an angle of 45 degrees with respect to the half mirror part 18, and is reflected in the direction of the first Fresnel lens along optical path 20. Here, a half mirror part 18 having a transmittance to reflectance ratio of 60:40 is used for the half mirror part 18, which may be adjusted as needed to 50:50 or 70:30, etc. The angles of the first reflector and the half mirror part are set to about 45 degrees, while those of the second reflector and third reflector are set to about 90 degrees, so that the device is manufactured to allow vertical and horizontal angle adjustment using a control device without distortion of the image source, for a more effective implementation.

The images thus transmitted and reflected from the background image surface 14 and the object image surface 13 are directed towards the second Fresnel lens 1, at which the second Fresnel lens 1 places the image of the background image surface 14 on the surface of the dark filter 8, which corresponds to the screen of the device, and places the image of the object image surface 13 as a 3-dimensional image at a certain distance in front of the filter 8. Here, the orientation of the image of the object image surface 13, when viewed with respect to the arrows of the object image surface 13, is expressed in a vertically and horizontally reversed form 24 after being transmitted through the first, second, and third reflectors, the first Fresnel lens, and the half mirror part, and finally through the second Fresnel lens part. On the other hand, the arrows of the background image surface 14 are magnified and reflected after being transmitted through the half mirror part 18, the second Fresnel lens, and the filter 8, whereby the image is expressed in a form that is reversed horizontally only with respect to the original image.

Figure 6:
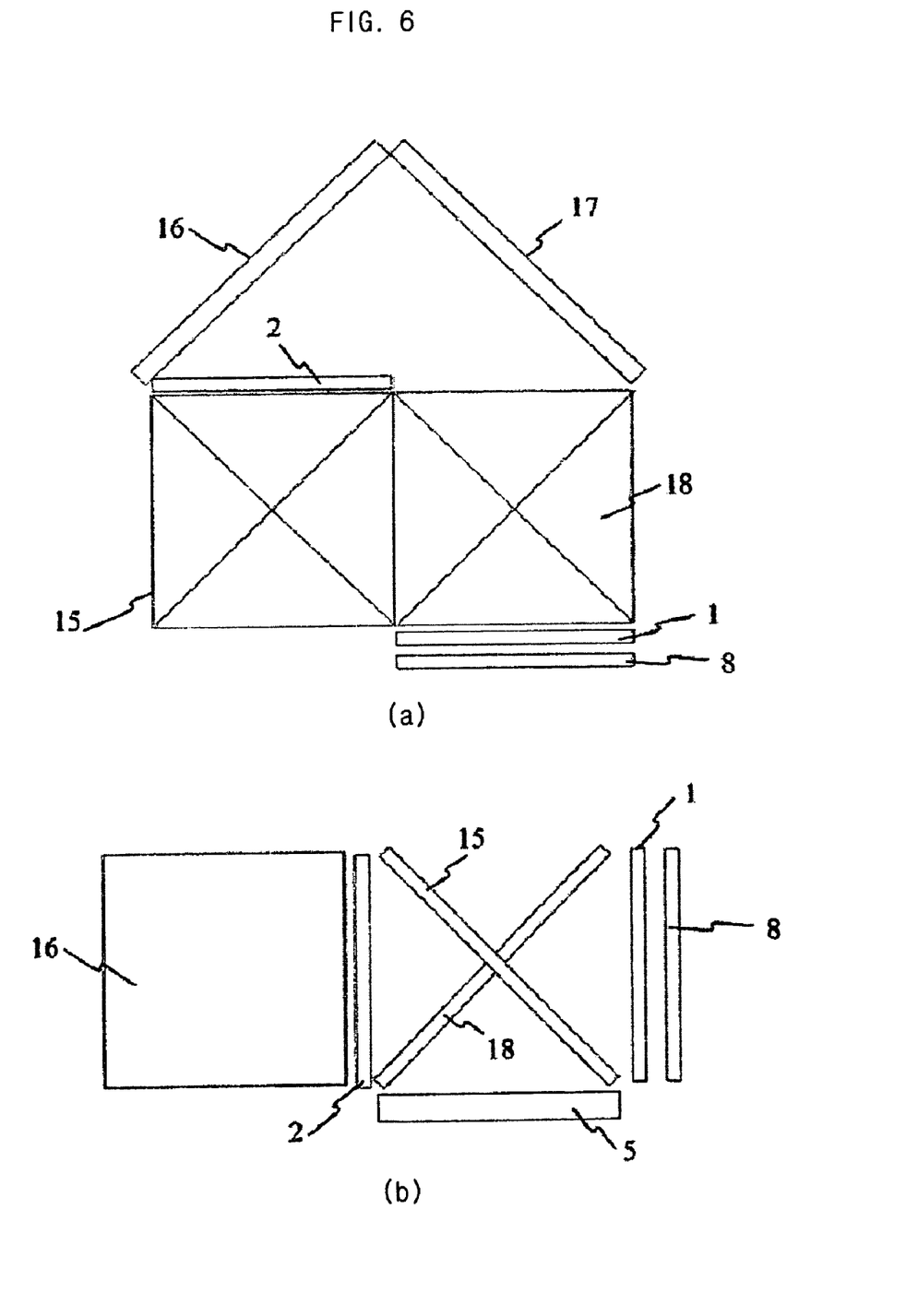
FIGS. 6(a) and 6(b) are a top view and a side view of a 3-dimensional video display device based on a first preferred embodiment of the present invention.

FIGS. 6(a) and 6(b) are a top view and a side view of a 3-dimensional video display device based on the first preferred embodiment of the present invention. First, FIG. 6(a) is a top view of the 3-dimensional image display device. A wide image source of 16:9 may be used for the image source, and the first reflector and the half mirror part are positioned respectively above the separated object image surface and background image surface. Also, the first Fresnel lens 2 is positioned for refracting and magnifying the object image source, behind which the second reflector part and the third reflector part are joined, the second reflector part and third reflector part preferably joined perpendicularly. The second Fresnel lens part for showing the 3-dimensional image and background image is composed of the second Fresnel lens 1 and the dark filter 8.

FIG. 6(b) is a side view of the 3-dimensional image display device based on the first preferred embodiment of the present invention. As in FIG. 6(b), the first reflector 15 and the half mirror part 18 are formed in the shape of an "X" above the image source supply part 5, and the image from the object image surface reflected on the first reflector is transmitted through the first Fresnel lens 2. In the portion where the second reflector and third reflector are formed perpendicularly, the image is first refracted and magnified by the second reflector 16 to be transmitted back in the direction of the half mirror part 18. Also, the image from the background image source 14 reflected by the half mirror part 18 is directed towards the second Fresnel lens 1. Regarding the background image and object image in the dark filter 8 region, the background image surface 14 is magnified by the second Fresnel lens 1 and is positioned in close proximity to the surface of the filter 8, and the object image surface 13 is positioned a certain distance in front of the filter 8. Thus, the magnified background image 21 and the 3-dimensional image 22 having a sense of depth of a certain distance are produced simultaneously.

Figure 7:
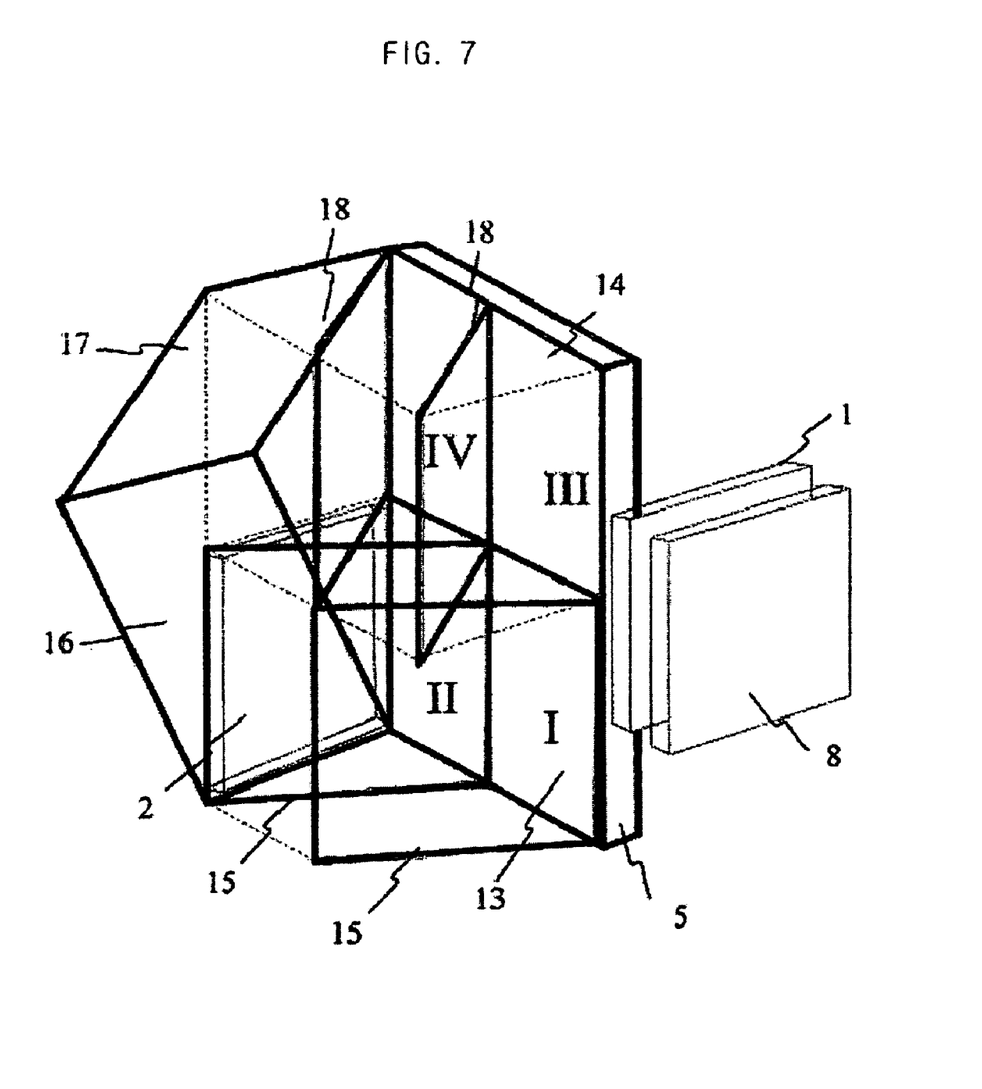
FIG. 7 is a structural diagram of a 3-dimensional video display device based on a second preferred embodiment of the present invention.

FIG. 7 is a structural diagram of a 3-dimensional video display device based on a second preferred embodiment of the present invention. Here, the display for a plurality of images corresponding to the embodiment of the invention may be split into a matrix form. For example, a 3-dimensional video display device having background display may be split in four into the I, II, III, and IV shapes for a single image source, as in the second embodiment, with two background images and two object images having different depths to provide a multi-image. In some cases, the connective composition may include rotation in the vertical or horizontal direction to offer the advantage of more effectively enhancing the 3-dimensionality of the image source. Moreover, in some cases the single image source may be composed in the form of independent image sources as two or four separate independent image sources, and by arranging such identical devices sequentially, a variety of effects may be produced. The number of displays described above is not limited to a specific number, and it is to be appreciated that different numbers may be used as necessary.

Figure 8:
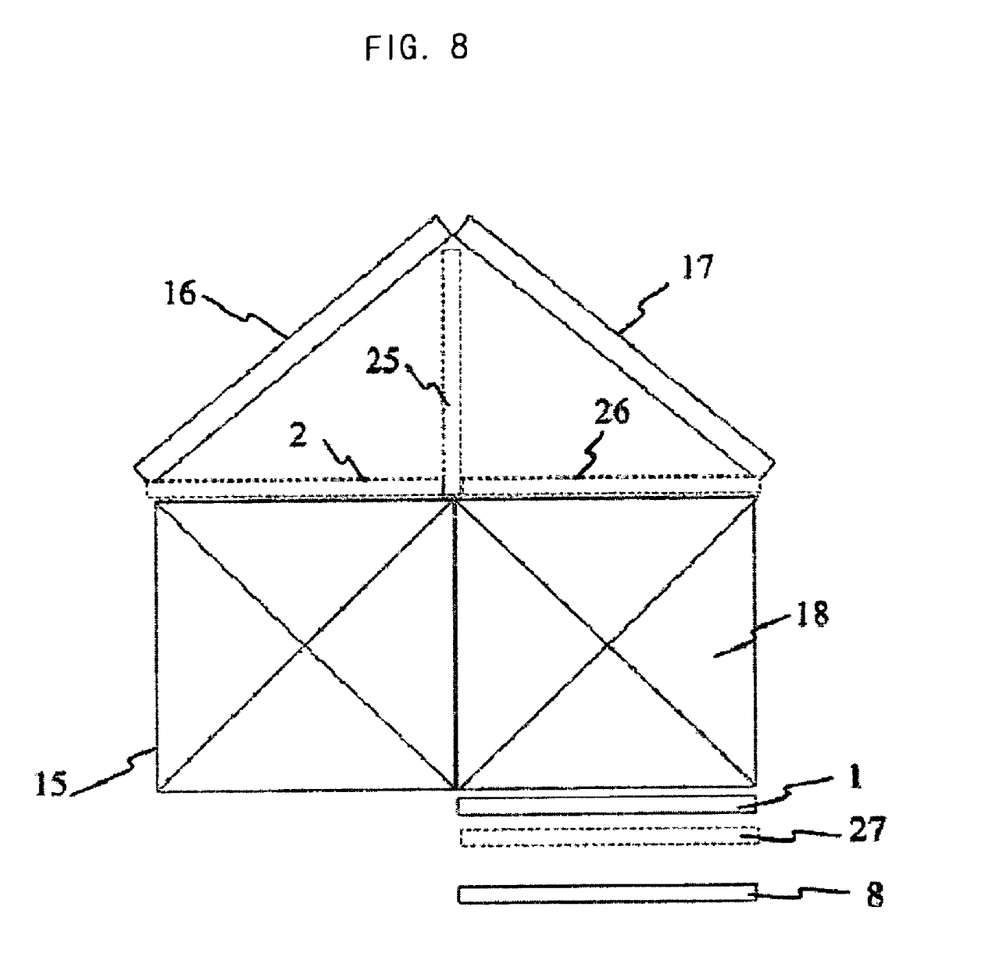
FIG. 8 is a structural diagram of a 3-dimensional video display device based on a third preferred embodiment of the present invention.

FIG. 8 is a structural diagram of a 3-dimensional video display device based on a third preferred embodiment of the present invention. When lenses having identical or different focal lengths are used for the first Fresnel lens and second Fresnel lens in the first preferred embodiment of the present invention, the projection and reflection distances may be adjusted for each lens to implement a more effective 3-dimensional video display device. Specifically, in the first embodiment, a third Fresnel lens 25 may be used instead of the first Fresnel lens 2, or the first Fresnel lens 2 may be used together with a fourth Fresnel lens 26. Besides this, a fifth Fresnel lens 27 may additionally be used to adjust the size or position of the 3-dimensional image for the composition of the first embodiment described above, and by means of such additional lens compositions of various forms, the 3-dimensional video display device may be used with a more effective production of background images and 3-dimensional images.

Here, a wide image source of 16:9 may be used for the image supply part according to a preferred embodiment of the invention, and a variety of display devices may generally be used, such as CRT's, LCD monitors, and PDP monitors.

Further, the effect of 3-dimensionality can be maximized by adding a variety of supplementary devices such as interactive image cameras or various RF communication sensors, etc. A 3-dimensional sound system may also be included to further enhance the 3-dimensional effect by simultaneously providing matching sounds with the image.

As set forth above, a preferred embodiment of the present invention can provide a 3-dimensional image display device which has a narrow overall width, by using a multi-reflector structure and half mirror part as well as Fresnel lenses to minimize the distance between a Fresnel lens and an image source, occurring in prior art.

Also, the present invention can implement a 3-dimensional image display device which forms a background image of a large display and provides a greater sense of perspective for an object image using only a single image source, and which is effective in allowing the overall display area of a screen to be magnified to a display of a large area.

Further, the present invention can also implement a 3-dimensional image display device with which a background image of a large display and an object image having a greater sense of perspective may be formed at a very low cost, using mass producible, inexpensive Fresnel lenses and only a single image source in product implementation. A 3-dimensional image display device based on the present invention can also provide the advantage of various possibilities for application and utility, such as in game consoles, video conferencing, indoor/outdoor large-scale advertisements and exhibition halls, event halls, theme parks, medical images, and various kiosk types, etc.

While the present invention has been described with reference to particular embodiments, it is to be appreciated that various changes and modifications may be made by those skilled in the art without departing from the spirit and scope of the present invention, as defined by the appended claims and their equivalents.

The invention claimed is:

1. A 3-dimensional image display device, comprising:
   an image source supply part split into two or more displays supplying different image sources;
   a first lens part for reflecting and refracting a first image source projected by the image source supply part;
   a half mirror part for reflecting and refracting the first image source projected from the first lens part and a second image source projected from the image source supply part; and
   a second lens part for refracting the first image source and the second image source projected by the half mirror part to form a 3-dimensional image.

2. The 3-dimensional image display device of claim 1, wherein the first image source is an object image, the second image source is a background image, and the 3-dimensional image is a synthetic image of the object image and the background image.

3. The 3-dimensional image display device of claim 1, wherein the first lens part comprises:
   a first reflector for reflecting the first image source;
   a first Fresnel lens for refracting the first image source reflected from the first reflector; and
   a second reflector and a third reflector, joined perpendicularly, for reflecting the first image source refracted from the Fresnel lens towards the half mirror part.

4. The 3-dimensional image display device of claim 3, wherein the first lens part is positioned between the second reflector and the third reflector and further comprises a third Fresnel lens for refracting the first image source.

5. The 3-dimensional image display device of claim 3, wherein the second lens part further comprises a fourth Fresnel lens for refracting the first image source and second image source to adjust the size and position of a 3-dimensional image.

6. The 3-dimensional image display device of claim 1, wherein the second lens part comprises a second Fresnel lens for refracting the first image source and the second image source.

7. The 3-dimensional image display device of claim 1, wherein the image source supply part is split into a matrix form of four or more displays supplying different image sources, each of the split displays supplying an object image or a background image.

* * * * *